United States Patent [19]

Uramoto

[11] Patent Number: 5,412,555
[45] Date of Patent: May 2, 1995

[54] SELF-OSCILLATING DC-DC CONVERTER WITH ZERO VOLTAGE SWITCHING

[75] Inventor: Hiroshi Uramoto, Hadano, Japan

[73] Assignee: Ricoh Company, Ltd., Tokyo, Japan

[21] Appl. No.: 136,198

[22] Filed: Oct. 15, 1993

Related U.S. Application Data

[63] Continuation-in-part of Ser. No. 857,437, Mar. 25, 1992.

[30] Foreign Application Priority Data

Mar. 26, 1991 [JP] Japan .................. 3-086076

[51] Int. Cl.$^6$ .......................... H02M 3/335
[52] U.S. Cl. ............................. 363/18; 363/19
[58] Field of Search ............... 363/18, 19, 97, 131

[56] References Cited

U.S. PATENT DOCUMENTS

4,933,830 6/1990 Sato et al. .................. 363/131
5,175,675 12/1992 Uramoto .................... 363/19

Primary Examiner—Steven L. Stephan
Assistant Examiner—E. To
Attorney, Agent, or Firm—Oblon, Spivak, McClelland, Maier & Neustadt

[57] ABSTRACT

The present invention is an ON/OFF type self-oscillating DC—DC converter with zero voltage switching and is provided with a transformer, a switching element on the primary side and a diode on the secondary side of the transformer, and configured so that the current (signal) flowing in the secondary side is detected by a resistor. The detected current is delayed by a comparator and provided with a short circuit which shorts the diode driven by the delayed signal. The present invention uses this arrangement to perform a switching operation at zero volts so that there is no switching loss, to improve the conversion efficiency and to have stable transmission operation even for non-load operation.

7 Claims, 6 Drawing Sheets

FIG. 2B
Ic
(NOT INCLUDE $D_2$)

FIG. 2C
Ic
(INCLUDE $D_2$)

FIG. 6D   INPUT $Com_2$ (+)

FIG. 6E

FIG. 6F   OUTPUT $Com_2$

SELF-OSCILLATING DC-DC CONVERTER WITH ZERO VOLTAGE SWITCHING

CROSS REFERENCE TO RELATED APPLICATIONS

The present invention is a continuation-in-part application of the U.S. patent application Ser. No. 07/857,437, filed Mar. 25, 1992.

BACKGROUND OF THE INVENTION

1. Field of the Invention

The present invention relates to a self-oscillating DC—DC converter, and in particular, to a self-oscillation DC—DC converter of the on-off type suited for use in power source apparatuses used in industrial equipment and office equipment, such as facsimile apparatuses and printers. Furthermore, the present invention relates to a self-oscillating DC—DC converter that can have an improved conversion efficiency, and can operate stably even when there is no load or when there is a light load.

2. Description of the Related Art

The ON-OFF types of DC—DC converters can be of a separate excitation oscillation type having separate excitation and oscillation, or of a self-oscillation type. The separate excitation oscillation type operates by means of an external oscillator, while the self-oscillation type performs a switching operation, and does not have a special oscillator. In general, the separate excitation oscillation type uses more parts when compared to the self-oscillation type; the resultant increase in cost means that the separate excitation type is rarely used.

A typical example of the self-oscillation type is the RCC (Ringing Choke Converter).

Figure 1:
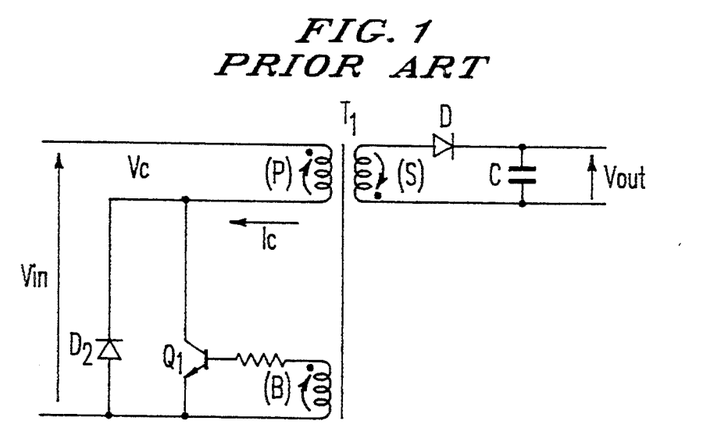
FIG. 1 is a block diagram showing the constitution of the main portions of a conventional type of switching regulator using the RCC method.

FIG. 1 is a block diagram showing the constitution of the main portions of a conventional type switching regulator using the RCC method. The conventional switching regulator is provided from a primary side circuit on the input side and a secondary side circuit on the output side. The primary side circuit comprises a diode D2, a transistor Q1, and a resistor R1, while the secondary side circuit comprises a diode D and a capacitor C. A transformer T1 is provided between the primary side circuit and the secondary side circuit.

The switching regulator shown in FIG. 1 has the transistor Q1, as a switching element, repeatedly perform an ON-OFF oscillation with a predetermined period, so that a square wave is generated on the second side (output side) of the transformer T1. This wave is converted into a DC voltage. The switching regulator stores the energy in the inductance (L) of the primary winding of the transformer T1 during the period when the transistor Q1 is in the ON state; when the transistor Q1 is in the OFF state, this energy is supplied to the smoothing capacitor C of the secondary side circuit and the load (not shown in the figure) via the rectifier diode D of the secondary side circuit.

Figure 2A:
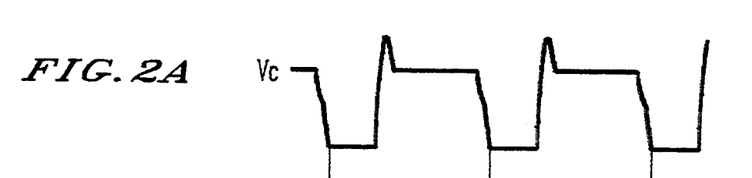
FIGS. 2A~2C are timing charts for describing the operation of a switching regulator of the RCC method of FIG. 1.
Figure 2B:
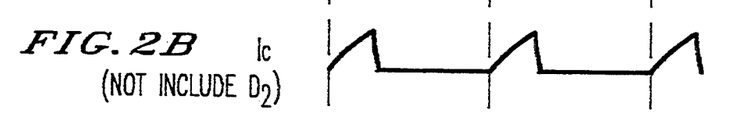
Figure 2C:
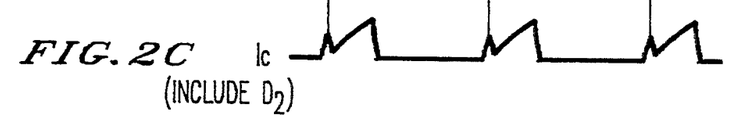

FIG. 2 is a timing chart for describing the operation of the switching regulator of the RCC method of FIG. 1. The numbers of the signal wave-form of FIGS. 2A, 2B and 2C correspond to each of the label positions in FIG. 1.

The transistor Q1 has a collector voltage as shown in FIG. 2A, and generates a current Ic of a sawtooth wave as shown in FIG. 2B. At this time, the main portion of the switching loss is generated when the transistor Q1 is in the OFF state.

In order to reduce the switching loss when the transistor Q1 is in the OFF state, a diode D2 is inserted at a position as shown in FIG. 1. However, as shown in FIG. 2C, the switching loss increases the time when the transistor Q1 is in the ON state. As a result, there is hardly any reduction in the overall switching loss.

Figure 3:
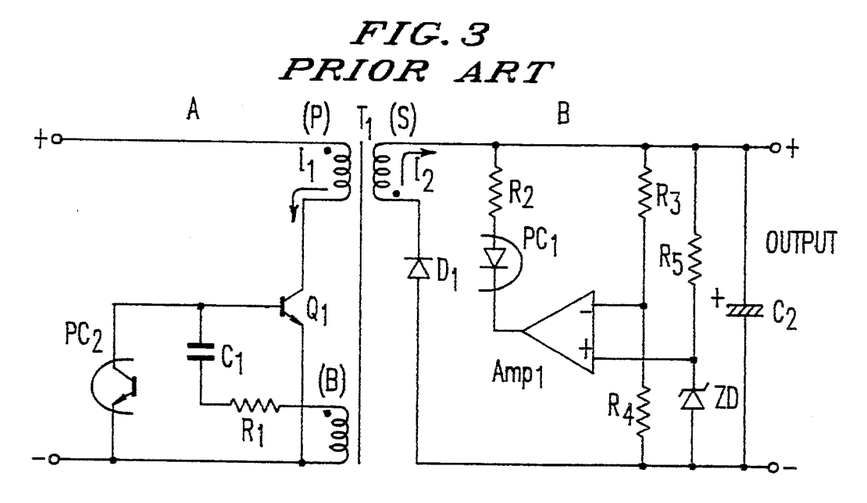
FIG. 3 is a view showing a detailed circuit constitution of the main portions of the switching regulator of FIG. 1.

FIG. 3 is a view showing a circuit configuration of the main portions of a conventional switching regulator of the RCC type. The primary side circuit of this switching regulator comprises a transistor Q1, photocouplers PC2, resistance R1 and a capacitor C1. The secondary side circuit of this switching regulator comprises a diode D1, a zener diode ZD, an amplifier Amp1 and capacitor C2, and resistors R2-R5. In FIG. 3, (S), (B) and (P) are each of the windings of the transformer T1. In addition, the current I1 and the current I2, shown by arrows represent the current of the primary side circuit, and the current of the secondary side circuit respectively.

FIG. 3 shows a detailed circuit configuration of the switching regulator of FIG. 1, thus the basic operation is the same as that of FIG. 1. When the transistor Q1 turns ON, the curent I1 increases, and when the transistor Q1 turns OFF, the capacitor C1 is charged by the current I1. Furthermore, energy is stored in the transformer T1. When the energy, stored in the transformer T1 increases beyond a predetermined value, energy is discharged to the secondary side circuit and an output voltage is generated.

Accordingly, as described above with respect to FIG. 2, a conventional switching regulator of the RCC type has a poor switching conversion efficiency because the switching loss becomes large irrespective of whether or not the diode D2 is provided. Additionally, because it is a self-oscillation switching regulator, when there is only a light load applied to the circuit, and the frequency becomes higher, unstable operation, such as intermittent operation, easily occurs.

SUMMARY OF THE INVENTION

Accordingly, it is a general object of the present invention to solve the above mentioned problems of the conventional technology and to provide a novel and effective switching regulator.

A more specific object of the present invention is to provide a switching regulator that can reduce the switching loss, and thus improve the conversion efficiency.

Another specific object of the present invention is to reduce the frequency change with respect to load fluctuations so that it is possible to provide a switching regulator of the RCC type that enables stable oscillation operation even when there is only a light load applied.

These objects can be achieved by a self-oscillating DC—DC converter comprising:

a primary side circuit having a switching element for repeatedly switching between an ON and OFF status, with a predetermined frequency, in accordance with a base current supplied to the switching element;

a secondary side circuit comprising a current detecting circuit for detecting a current flowing in the secondary side circuit, and a delay circuit for delaying, by a predetermined time, the signal detected by the current detecting circuit, a short circuit for shorting a diode driven by a delayed signal from the delay circuit;

a transformer which stores energy due to excitation of a magnetic flux when the switching element is in the ON state, discharges the energy in a reverse excitation when the switching element is in the OFF state, the switching element then assuming the ON state when the reverse excitation is removed, and such a transformer performs zero-voltage switching.

BRIEF DESCRIPTION OF THE DRAWINGS

FIG. 8C shows that voltage value is OV before switch turns ON;

FIGS. 8A~8E show the circuit voltage relationship with respect to the short circuit device when the current flows.

DESCRIPTION OF THE PREFERRED EMBODIMENTS

The following is a description of the switching regulator of the present invention, with reference to the appended drawings.

Figure 4:
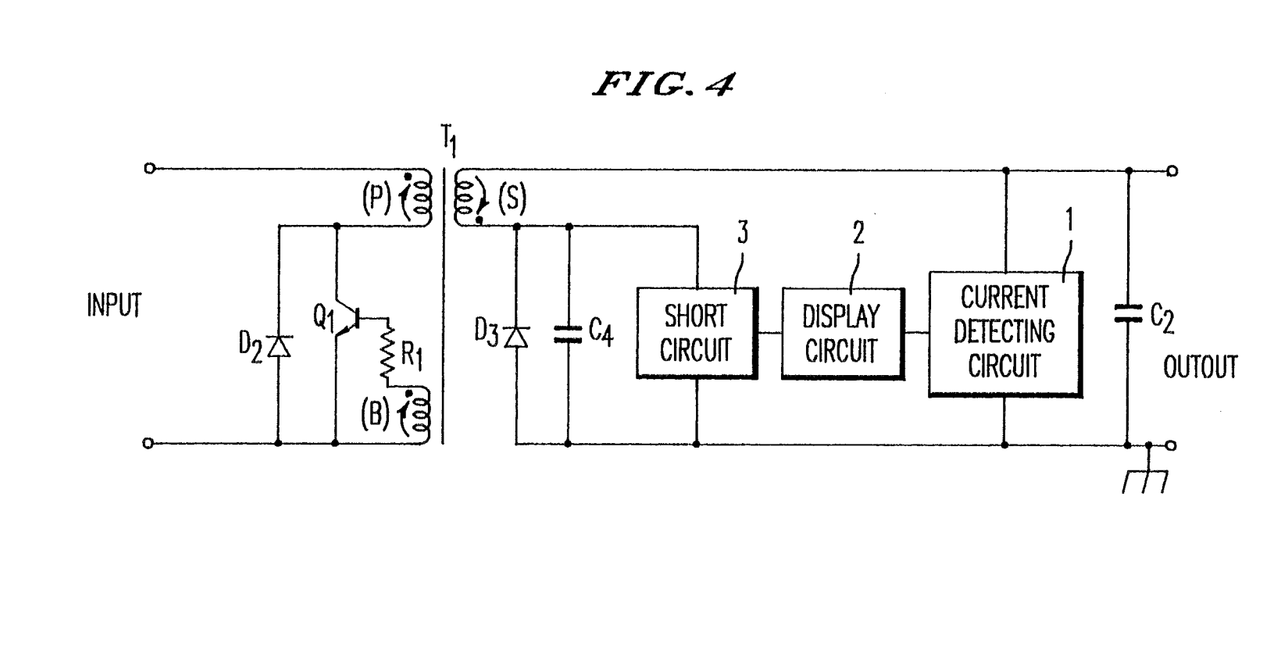
FIG. 4 is a view of the function blocks of the switching regulator of the present invention.

In FIG. 4, a switching regulator comprises a primary-side circuit which is the input side, and a secondary-side circuit, which is the output side.

The primary side circuit has the same configuration as that shown in FIG. 1, and includes the diode D2, the transistor Q1 and the resistor R1. The secondary side circuit includes the diode D3, the capacitors C2 and C4, the current detecting circuit 1, which detects the current flowing to the secondary side circuit, the delay circuit 2, which delays the current detected by the current detecting circuit 1, and the short circuit 3, which shorts the diode driven by the delay signals delayed by the delay circuit 2. The transformer T1 is provided between the primary side circuit and the secondary side circuit.

The following is an outline description of the operation of the DC—DC converter of FIG. 4.

The following is a detailed description of this current flow.

When the transistor Q1 of the primary side circuit turns ON, a positive voltage is supplied to the windings (P), (B) and (S) of the transformer T1. The transformer T1 is supplied with current from the winding (P) and at the same time there is a discharge of a small current from winding with the winding (B). The current from winding (S) is cut by the diode D3. Accordingly, the magnetic flux of the entire transformer T1 is excited. The transistor Q1 turns OFF after the elapse of a certain time when the collector current of the transistor Q1 has exceeded twice $\beta$, where $\beta$ is the current amplification ratio of the supply current from the resistor R1.

When the transistor Q1 assumes the OFF state, a negative voltage is applied to the windings (P), (B) and (S) of the transformer T1, and the transformer excitation energy starts to discharge. The transistor Q1 is OFF and so a current does not flow in the winding (P), and the base of the transistor Q1 of the primary side circuit is in the reverse bias status and so there is no current in the winding (B). A current flows via the diode D3 and is thus supplied to the OUTPUT of the winding (S).

Figure 8A:
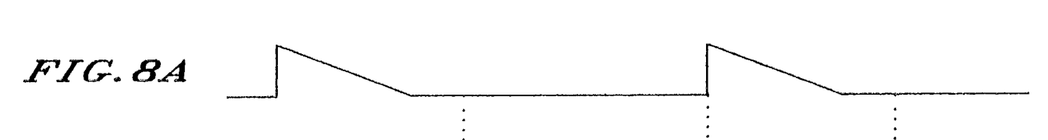
Figure 8B:
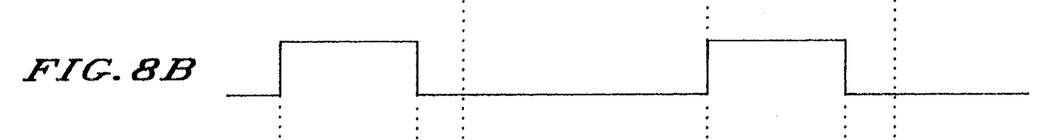
Figure 8C:
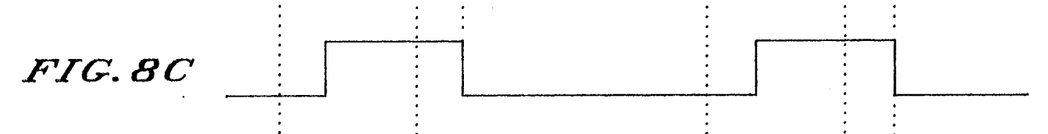
Figure 8D:
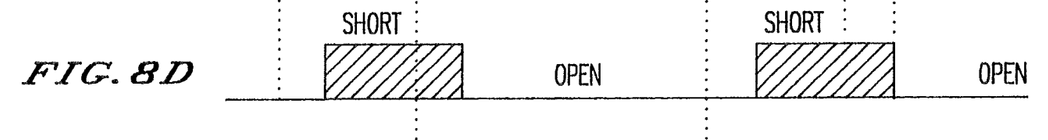
Figure 8E:
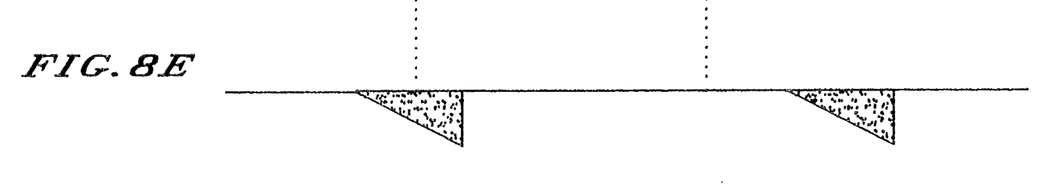

The current which is supplied to OUTPUT via the diode D3 is detected by the current detecting circuit 1. This signal is a binary signal which is delayed by the delay circuit 2 and input to the short circuit 3. FIGS. 8A, 8B, 8C, 8D and 8E show the circuit voltage relationship with respect to the short circuit device 3 when the current flows. FIG. 8A shows the current of the diode D3, while FIG. 8B shows the output of the current detecting circuit, FIG. 8C shows the output delay circuit, FIG. 8D shows the short circuit 3, and FIG. 8DE shows the current through the short circuit 3.

It can be seen that the short circuit 3 shorts soon after the status described above, when the current flows to the diode D3.

While the current flows (forward bias) to the diode D3, the status of the short circuit 3 does not influence the circuit operation but the current of the diode D3 is reduced to zero and, from that instant, there is flow of a reverse current via the short circuit 3. The source of this reverse current is the capacitor C2 of (OUTPUT). This is to say that when the diode D3 is ON, the energy is discharged to OUTPUT from the transformer T1, but, that immediately after this, the energy is returned by the short circuit 3 (by the transformer T1 being excited in the reverse direction). This reverse direction excitation of the transformer T1 is performed only during a time determined by the delay circuit 2.

When the short circuit 3 is OFF, the polarity of the transformer T1 is inverted, and a positive voltage is applied to the windings (P), (B) and (S). The reverse direction excitation energy of the transformer T1 is discharged via the diode D2, and the transistor Q1 is shorted across the collector-emitter junction thereof at this time.

Eventually, the transformer T1 returns to the initial status when the reverse excitation of the transformer T1 is removed and, at this time, current is already flowing to the base of the transistor Q1 from the winding (B) via the resistor R1. Then, the transistor Q1 goes into the ON state, and the collector voltage of the transistor Q1 is not supplied when the current of the transistor Q1 starts to flow. Accordingly, this state achieves a zero-voltage switching.

Figure 5:
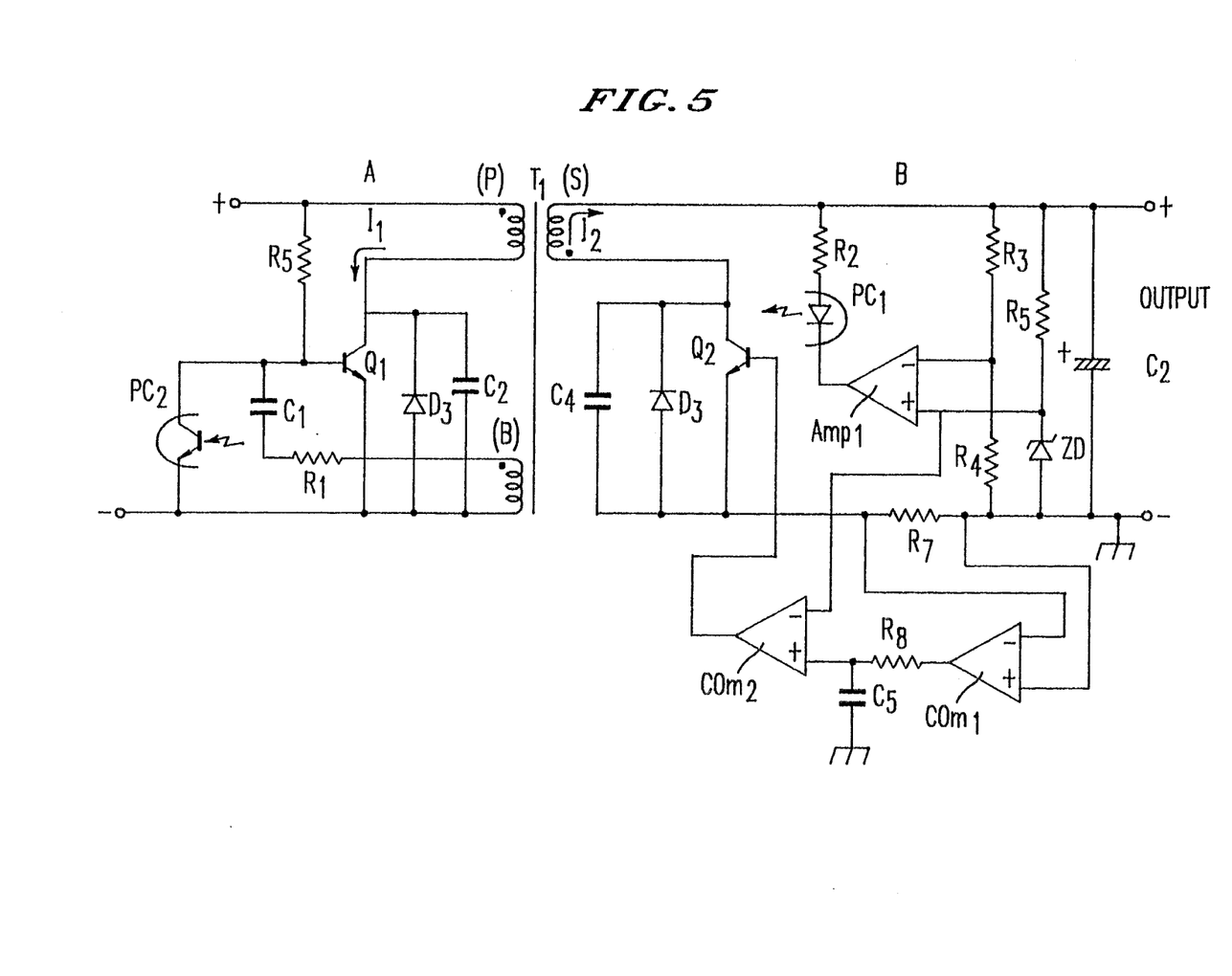
FIG. 5 is a circuit diagram showing a detailed constitution of the switching regulator of FIG. 4.

The following describes the correspondence between the configurations of FIGS. 4 and 5. First, the current detecting circuit 1 of FIG. 4 is the circuit for detection of the current I2 which flows in the secondary side circuit, and corresponds to the resistance R7 in FIG. 5. The delay circuit 2 of FIG. 4 is the circuit for applying a delay of a required time to the current I2 detected by the current detecting circuit 1 and for supplying that current to the short circuit 3, and corresponds to the comparators com1, com2 in FIG. 5. The short circuit 3 of FIG. 4 is the circuit which shorts the diode D3 driven by the signal from the delay circuit 2, and corresponds to the transistor Q2.

The following is a detailed description of the DC—DC converter's constitution with reference to FIG. 5. The current detection circuit 1 of FIG. 4, has a function of detecting the current I2 flowing in the secondary side circuit. In FIG. 5, the resistance R7 and comparator com1 corresponds to the current detection circuit 1 of FIG. 4.

In FIG. 5, resistance R8, comparator C5 and comparator C2 correspond to the delay circuit 2 of FIG. 4. Comparators Com1 and Com2 delay the detected current I2, and supply the delayed signals to the short circuit 3.

In FIG. 5, the transistor Q2 corresponds to the short circuit 3 of FIG. 4. The base of the transistor is supplied with delay signals from the delay circuit 2 of FIG. 4. The transistor Q2 shorts the diode D3 that is driven by the delay signals.

An amplifier AMP1 as shown in FIG. 5 compares the standard voltage given by a zener diode ZD with such a voltage as given, according to the voltage dividing ratio, by resistors R3, R4 and supplies the photocoupler PC with sufficient current, amplifying the error known from such a comparison.

Photocouplers PC1 and PC2 as shown in FIG. 5 are the same. Photocoupler PC2 uses a light emission diode to turn ON/OFF a transistor Q1 in the primary circuit corresponding to light generated from photocoupler PC1, which converts photo-energy into current, the current is then supplied by the amplifier Amp1. If the output voltage from the resistors is low, the output voltage from the amplifier AMP1 will be high, and no current will flow to the photocoupler PC1, turning OFF the transistor Q1. As a result, there will not exist any current bypass to the transistor Q1 base from outside. Accordingly, comparators Com1 and Com2 gain the maximum output. On the contrary, if the output voltage from the resistors is high, the output voltage of the amplifier AMP1 will be low in level, supplying current to the photocoupler PC2, and putting the transistor Q1 into an ON-state. The base current of the transistor Q1 is subsequently bypassed, turning down the output-current. As seen from above, the photocoupler PC1 receives current from the amplifier AMP1 and controls the base current of the transistor Q1.

The following is a detailed description of the circuit constitution of FIG. 5. The primary side circuit of the switching regulator shown in FIG. 5 comprises a transistor Q1, which is a switching element, capacitors C1 and C3, resistors R1 and R6, and the photocoupler PC2, which couples two electrical circuits by means of an optical fiber.

The secondary side circuit comprises a transistor Q2, a rectifier diode D3, capacitors C2, C4 and C5, resistors R2, R3, R4, R5, R7, and R8, a photocoupler PC1, an amplifier Amp1, comparators Com1 and Com2 that delay the input signals, and a zener diode ZD that maintains a stable reference voltage across the two ends of the zener diode when, largely because of a reverse voltage, the current flow changes. A transformer T1 that stores the energy is provided between the primary side circuit and the secondary side circuit.

Of the constituting elements described above, the resistor R7 and the comparator Com1 comprise the current detection circuit. The current detection circuit detects the current I2 of the secondary side circuit. The resistance R8, the capacitor C5 and the comparator Com2 comprise the delay circuit 2. The delay circuit 2 delay the signal detected by the current detection circuit 1. The transistor Q2 comprises the short circuit 3.

Transistors Q1, Q2 use bipolar transistors in this invention. Moreover, the transistors Q1, Q2 can be FET transistors.

The basic operation of the switching regulator shown in FIG. 5 is the same as that of the conventional circuit shown in FIG. 3. The following is a description of an operation of FIG. 5.

i) When the transistor Q1 turns ON, a positive voltage is supplied to the winding (P), (B) and (S) of the transformer T1. The transformer T1 is supplied with current from the winding P and, at the same time, there is the discharge of a small current from the winding (B). The current from the winding (S) is cut by the diode D3. Accordingly, the entire transformer T1 stores the energy from excitation.

ii) Next, the transistor Q1 turns OFF when the base voltage of the transistor Q1 becomes lower and the collector voltage drops to 0 V. At this time, the capacitor C3 holds the collector voltage of the transistor Q1 at 0 V until the transistor Q1 turns OFF.

FIG. 6 is a timing chart for describing the operation of the switching regulator of the present invention. The symbol appended to each of the signal waveforms corresponds to respective states of FIG. 5.

Figure 6A:
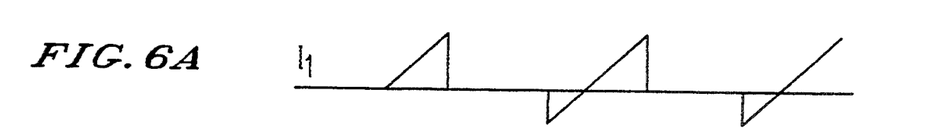
FIGS. 6A~6F are timing charts for describing the operation of the switching regulator of FIG. 5.
Figure 6B:
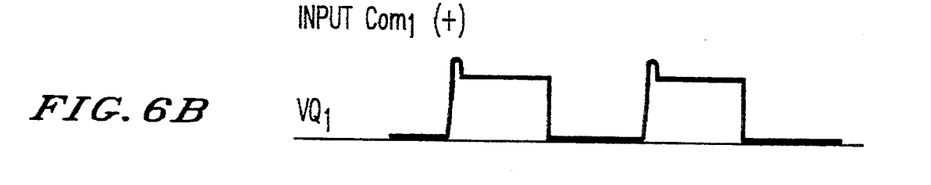

The voltage VQ1 in FIG. 6B indicates the collector voltage of the transistor Q1 of FIG. 5.

(1) The diode D3 conducts, through the winding (B) of the transformer T1 of the primary side, voltage which changes from the OFF state to the ON state for the transistor Q1. The transistor Q1 is supplied base-voltage from the winding (B) of the transformer T1, the transistor Q1 is switched to the ON state from the OFF state. When the transistor Q1 turns to the ON state from the OFF state, the current I1 increases linearly (FIG. 6A).

(2) When the base current of the transistor Q1 becomes insufficient and the voltage of the transistor Q1 becomes 0 V, the transistor Q1 switches to the OFF state. At this time, the collector voltage of the transistor Q1 is held at 0 V by the capacitor C3. Accordingly, it is possible for the switching regulator to perform a switching operation with no loss.

(3) When the transistor Q1 is turned to the OFF state, the capacitor C3 of the primary side is charged by the current I1. In addition, the collector voltage of the transistor Q1 rises (FIG. 6B). However, when the collector voltage exceeds a predetermined voltage, the current I2 starts to flow via the diode D3 on the secondary side. Thus, the winding (B) of the transformer T1 maintains the OFF state of the transistor Q1.

Figure 6C:
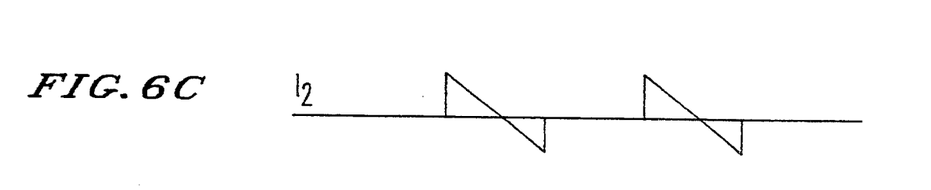

(4) The current I1 of the primary side circuit causes the energy stored in the transformer T1 to be discharged via the current I2 of the secondary side. This current I2 is reduced linearly, with time (FIG. 6C).

Figure 6D:
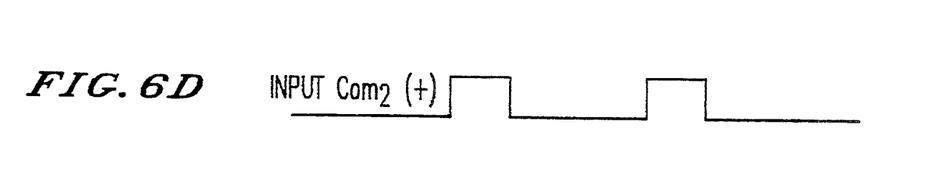
Figure 6E:
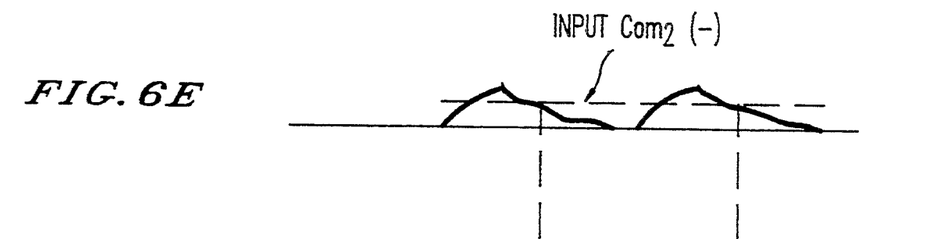

(5) This current I2 of the secondary side is monitored by the resistance R7. The comparator Com1 has input thereto the reference signal from the zener diode ZD applied to its input, the divided signal by the resistors R3, R4 and the monitored signal. The output signal of the comparator Com1 is delayed via a low pass filter which includes resistor R8 and capacitor C3, and is output to the comparator Com2. The comparators Com1, Com2 delay the current I2 (FIGS. 6D, 6E). The output of the comparator Com2 (FIG. 6F) is a supply to the base of the transistor Q2.

Figure 6F:
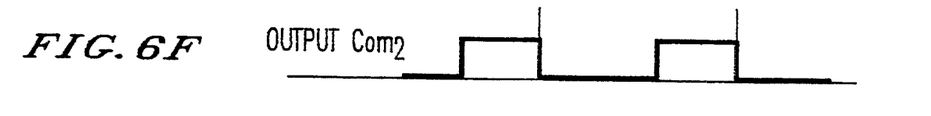

When the base signal is at the high level, the transistor Q2 turns to the ON state when the diode D3 has been conducting for a predetermined period of time.

(6) By the operation described in (5) above, the current I2 starts to flow in the negative direction (FIG. 6C), via the transistor Q2, after the current I2 that has started to flow in the diode D3 becomes "0".

(7) When the current I2 has flowed for a predetermined time, the transistor Q2 is turned to the OFF state, when the output signal from the comparator Com2 is changed to the low level. By this, the current I2 in the negative direction is cut (FIG. 6C).

(8) This current I2 in the negative direction applies a reverse bias energy to the transformer T1. The transistor Q2 is switched to the OFF state from the ON state, then, the current I2 is cut off, the current I2 of the negative direction thus generating a current I1 in the negative direction of the primary side and via the diode D2 (FIG. 6A).

(9) At the same time as the operation described in (8) above, a reverse excitation energy that makes the collector voltage of the transistor Q1 into 0 V is generated in the winding (P) of the transformer T1. In addition, the winding (B) of the transformer T1 supplies the high level base signal, the transistor Q1 thus turning to the ON state from the OFF state.

(10) Immediately prior to when the transistor Q1 turns ON, when the primary side circuit is already conducting because of the diode D3, the circuit voltage between the emitter and the collector is 0 V, and the switching regulator circuit is in the state where a switching operation takes place. The transistor Q1 is switched to the ON state, the capacitor begins to build up the electric charge. The transistor Q1 is then switched to the OFF state from the ON state, and the capacitor C3 discharges the electric charge.

(11) When the transistor Q2 is OFF, the capacitor C4 holds the circuit voltage at 0 V. The ON-OFF switching operation of the two transistors Q1 and Q2 of the present invention is performed when the circuit voltage is 0 V.

Because of the operation described above in (1) through (11), the switching operation of both of the transistors Q1 and Q2 of the switching regulator of the present invention, is always performed when the circuit voltage is 0 V. Accordingly, in principle, the switching loss is reduced and the conversion efficiency is increased.

Conversion efficiency is expressed by output power/input power. When it supposed that the conversion efficiency (output voltage/input voltage) is 100%, and internal loss is 0.50%, then the output power may, in some cases, be equal to the inner loss in some cases. Then, if the internal loss is reduced, the conversion efficiency will increase. In addition, the switching regulator of the present invention maintains constant during the ON time and the OFF time of the switching device even when a light load or no load is applied to the circuit. More specifically, when there is no load applied the current areas shown in FIG. 6A and FIG. 6B in the positive direction or in the negative direction of the current, I1 and I2 become equal. As a result, there is no extreme reduction of the pulse width, and so the switching regulator can realize a stable oscillation operation. The operation is substantially similar when there is only a light load applied.

Because of this, in principle, with the DC—DC converter of the present invention, the capacitor C3 is switched when the circuit voltage is 0 V and so the switching loss of the switching operation is reduced, and the conversion efficiency is improved. In addition, in a DC—DC converter having a constant voltage output, the present invention ensures uniform ON times and OFF times of the switching device even in cases when a light load or no load is applied to the circuit. Here, light load denotes a load which has a high output resistance R0, in that the supply power V0/R0 of the output is small, while a no-load status denotes when R0=∞. More specifically, when there is no load, the current areas for the forward directions and the reverse directions of the currents I1, I2 become equal. This is to say that when there is no load, the energy discharged from the winding S, OUTPUT, and the energy supplied from the winding P are zero. The present invention has forced reverse excitation from a constant time S and so the excitation from the winding P is applied in the same manner. At this time, the respective areas (energies) of the currents I1, I2 are equal. This is to say these currents become ±0.

Furthermore, there is a switching operation in the state where the voltage is 0 V, hence there is low noise since there is no generation of a small current of a parasitic capacity that the device has.

Furthermore, the switching regulator has an ON/OFF time of constant intervals, even if no load is applied, hence there is stable oscillation.

A conventional RCC comparator allows frequency to increase at a light load. At no-load, intermittent oscillation occurs, and oscillating itself is made unstable. As a result, the use of such a comparator of the RCC is limited.

The present invention is the same as the conventional RCC in terms of an OFF state of transistor Q1 in the primary circuit. The photocoupler PC1 bypasses the transistor base current, thus switching ON/OFF the transistor Q1. The transistor Q1 operates completely differently from the conventional RCC when it is in the ON state. Reverse exciting current of the transformer T1 reverses the transformer T1 relative potential, so that the transistor Q1 is forced to be at a 0 potential. Current flows only to the diode D2 in the reverse direction, leaving the transistor Q1 at 0 V.

Figure 7A:
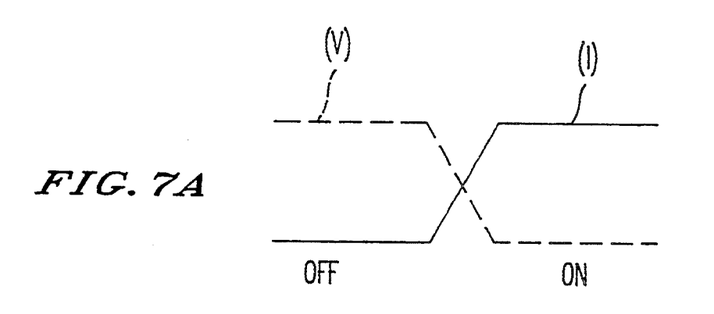
FIG. 7A shows statuses for voltage value and current value when current does not flow and when current flows.
Figure 7B:
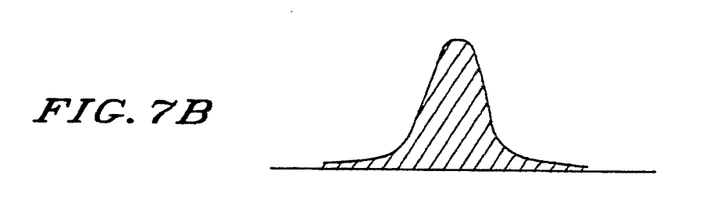
FIG. 7B shows switching loss according to FIG. 7A.
Figure 7C:
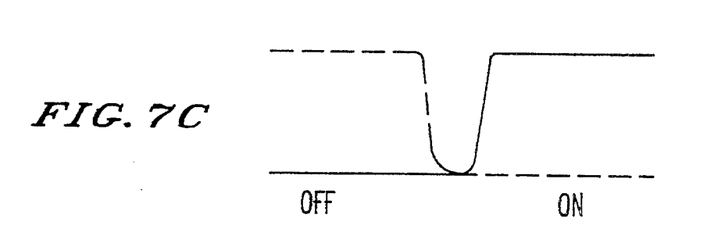
Figure 7D:
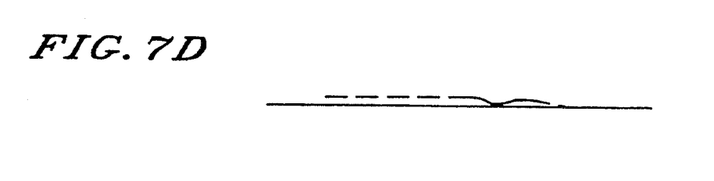

FIG. 7A shows the status of the circuit for voltage and current values in cases where current does not flow and where current flows. FIG. 7B shows a switching loss according to FIG. 7A. FIG. 7C shows that the voltage value of the circuit is 0 V before switch turns ON. FIG. 7D shows a switching loss according to FIG. 7C. If the switch has electric potential when current is turned from the OFF state to the ON state instantaneously, power dissipation will happen according to an integration (current ∫ voltage), the switching regulator generates power loss as shown in FIG. 7B. Accordingly, when the switch is turned to the ON state, but potential is 0 V in advance of switching, as illustrated in FIG. 7C, no power loss will arise, as shown in FIG. 7D.

Further, the present invention is not limited to these embodiments, but various variations and modifications may be made without departing from the scope of the present invention.

What is claimed is:

1. A self-oscillating DC—DC converter with zero voltage switching, said converter comprising:
    a primary side circuit having a switching element for repeatedly switching between ON and OFF states, with a predetermined frequency, in accordance with a base current supplied to said switching element;

a secondary side circuit comprising a current detecting means for detecting a current flowing and generating a corresponding signal in said secondary side circuit, and a delay means for delaying by a predetermined time said signal detected by said current detecting means, a shorting means for shorting a diode driven by a delayed signal from said delay means;

a transformer for storing energy due to excitation of a magnetic flux when said switching element of said primary side circuit is in said ON state, said transformer discharges said energy in a reverse excitation when said switching element of said primary side circuit is in said OFF state during said predetermined time of said delay means, said switching element returning to said ON state when said reverse excitation is removed by said shorting means, said transformer performing a zero voltage switching.

2. The DC—DC converter as claimed in claim 1, wherein said shorting means excites said transformer in a reverse direction by using a capacitor of an output side of said secondary side circuit as the power source, when said switching element is in said OFF state and said current detecting means detects that a current of said diode is zero, and a signal delayed by a required time by said signal delay means is input to said shorting means.

3. The DC—DC converter as claimed in claim 1, wherein said current detecting means includes a resistor and a comparator.

4. The DC—DC converter as claimed in claim 1, wherein said signal delay means includes a resistor, a capacitor and a comparator.

5. The DC—DC converter as claimed in claim 1, wherein said shorting means includes a switching element.

6. The DC—DC converter as claimed in claim 1, wherein said transformer has first, second, and third windings, and wherein when said switching element of the primary side circuit is in said ON state, a magnetic flux being excited by a positive voltage charges said first, second and third windings of said transformer, a current flows from said first winding, a small current discharges from said second winding, and a current of said third winding being cut off, and wherein, when said switching element of said primary side circuit is in said OFF state, a negative voltage charges said first, second and third windings, current not flowing in said first and second windings, a current flows to said third winding via said diode, and the polarity of an excitation energy of said transformer is reversed.

7. A self-oscillating D.C.—D.C. converter with zero voltage switching, comprising:

a transformer (T1) with a first winding (P) having a first terminal connected to a first input terminal on a primary side;

a first transistor (Q1) having a collector terminal connected to a second terminal of the first winding (P) and an emitter terminal connected to a second input terminal on the primary side;

a first diode (D2) having an anode connected to the second terminal of the first winding (P) and a cathode connected to the second input terminal;

a first capacitor (C1) having a first terminal connected to a base terminal of the transistor (T1);

a first resistor (R1) having a first terminal connected to a second terminal of the first capacitor (C1);

a second winding (B) of the transformer (T1) having a first terminal connected to a second terminal of the first resistor (R1) and a second terminal connected to the second input terminal;

a third winding (S) having a first terminal connected to a first output terminal on a secondary side of the transformer (T1);

a second transistor (Q2) having a collector terminal connected to a second terminal of the third winding (S);

a second diode (D3) having an anode connected to the second terminal of the third winding (S) and a cathode connected to an emitter terminal of the second transistor (Q2);

a second resistor (R2) having a first terminal connected to the first output terminal;

a first photocoupler (PC1) having a cathode connected to a second terminal of said second resistor (R2);

a first amplifier (Amp1) having an output terminal connected to an anode of the first photocoupler (PC 1);

a third resistor (R3) having a first terminal connected to the first output terminal and a second terminal connected to a negative input terminal of the first amplifier (Amp1);

a fourth resistor (R4) having a first input terminal connected to the negative input terminal of the first amplifier (Amp1) and a second terminal connected to a second output terminal, being connected to ground;

a fifth resistor (R5) having a first terminal connected to the first output terminal;

a zener diode (ZD) having an anode connected to a second terminal of the fifth resistor (R5) and connected to a positive input terminal of the first amplifier (Amp1);

a second capacitor (C2) having a first terminal connected to the first output terminal and a second terminal connected to the second output terminal;

a third capacitor having a first terminal connected to the second terminal of the first winding (P) and a second terminal connected to the second input terminal;

a second photocoupler (PC2) having a collector terminal connected to the first terminal of the first capacitor (C1) and an emitter terminal connected to the second input terminal;

a sixth resistor (R6) having a first terminal connected to the first input terminal and a second terminal connected to the base terminal of the first transistor (Q1);

a seventh transistor (R7) having a first terminal connected to the emitter terminal of the second transistor (Q2) and a second terminal connected to the second output terminal;

a fourth capacitor having a first terminal connected to the second terminal of the third winding (S) and a second terminal connected to the first terminal of the seventh resistor (R7);

a first comparator (Com1) having a negative input connected to the first terminal of the seventh resistor (R7) and a positive input terminal connected to the second terminal of the seventh resistor (R7);

an eighth resistor (R8) having a first terminal connected to an output terminal of the first comparator (Com1);

a fifth capacitor (C5) having a first terminal connected to a second terminal of the eighth resistor (R8) and a second terminal connected to ground; and a second comparator (Com2) having a positive input terminal connected to the second terminal of the eighth resistor (R8), a negative input terminal connected to the positive input terminal of the first amplifier (Amp1) and an output terminal connected to a base terminal of the second transistor (Q2).

* * * * *